United States Patent [19]

Usami et al.

[11] 4,223,914
[45] Sep. 23, 1980

[54] SEATBELT SYSTEM

[75] Inventors: Susumu Usami; Toshiaki Asai; Yoshio Tsujiuchi, all of Aichi, Japan

[73] Assignee: Kabushiki Kaisha Tokai Rika Denki Seisakusho, Aichi, Japan

[21] Appl. No.: 963,867

[22] Filed: Nov. 27, 1978

[30] Foreign Application Priority Data

Nov. 28, 1977 [JP] Japan .................... 52-159296

[51] Int. Cl.² .................................................. B60R 21/10
[52] U.S. Cl. .................................. 280/803; 280/808; 297/468
[58] Field of Search ............... 280/803, 801, 802, 808; 297/475, 468, 486, 487, 488, 482, 483

[56] References Cited

U.S. PATENT DOCUMENTS

| 3,833,238 | 9/1974 | Liard | 280/803 |
| 3,836,172 | 9/1974 | Hildebrandt | 280/801 |
| 3,984,128 | 10/1976 | Oehm et al. | 297/488 |

Primary Examiner—John J. Love
Assistant Examiner—Donn McGiehan
Attorney, Agent, or Firm—Pollock, Vande Sande & Priddy

[57] ABSTRACT

One end of a webbing for restraining an occupant is wound up by a retractor installed on a door so that the webbing can be fitted to or released from the occupant seated as the door is closed or opened. An engaging portion is formed on the retractor and an engageable portion for receiving said engaging portion when the door is closed is provided in the body of vehicle, said engaging and engageable portions imparting a high tension of the webbing to the body of vehicle during an emergency of the vehicle, so that the webbing can reliably restrain the occupant.

15 Claims, 9 Drawing Figures

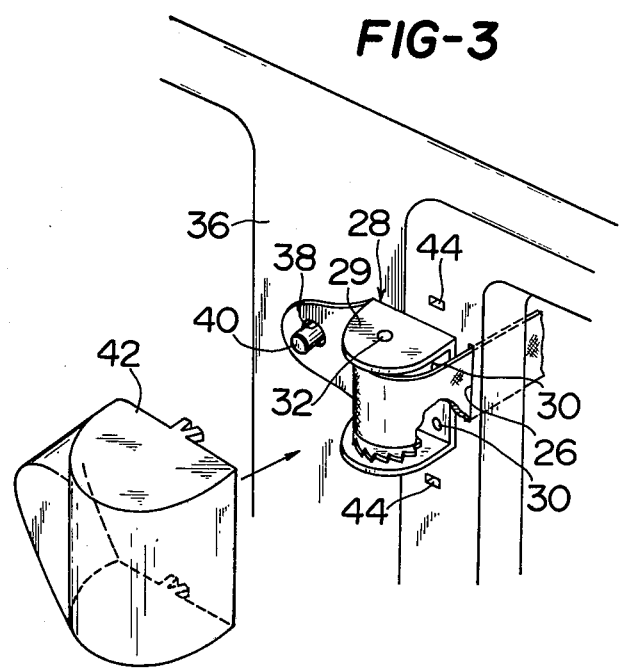
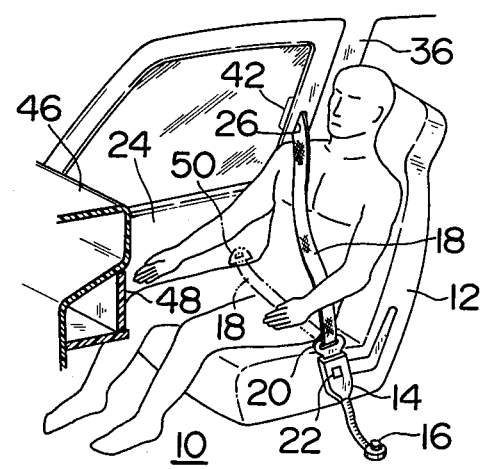

SEATBELT SYSTEM

BACKGROUND OF THE INVENTION

1. Field of the Invention

The present invention relates to a seatbelt system for restraining and protecting an occupant during an emergency in a vehicle, and particularly, to a seatbelt system capable of automatically assuming a properly worn condition after the occupant gets into the vehicle.

2. Description of the Prior Art

Even though a seatbelt system safely protects an occupant of a vehicle during an emergency involving the vehicle, the incidence of seatbelt use remains very low. Hence, automatic seatbelt systems have been proposed in which the occupant is automatically restrained by the seatbelt system. Particularly, a seatbelt system has been proposed which provides appropriate restraint during emergencies and is quite economical. In this system a retractor for winding up one end of the webbing which retains the occupant is engaged with a substantially central portion of the vehicle, the other end of the webbing being engaged with an upper portion of the vehicle door. When the door is closed after the occupant is seated, the webbing is automatically, obliquely fitted about the upper half of the occupant's body to restrain the occupant. At the same time, a knee pad is provided beneath the instrument panel to limit the forward movement of the lower half of the occupant's body during an emergency involving the vehicle.

However, in such a seatbelt system, the webbing always moves in sliding contact with the body of the occupant whenever the door is opened or closed or the occupant moves about within the vehicle, thereby giving the occupant an uncomfortable feeling to a considerable extent. In wet weather, the end portion of webbing withdrawn from the vehicle as the door is opened in moistened by rain, so that when this portion of the wet webbing contacts the upper half of the body or the clothes of the occupant when the door is closed, it causes a very uncomfortable feeling to the occupant similarly to the above case. Further, a member for connecting the end of the webbing to the inside of the door, a member provided at the intermediate portion of the webbing for releasing the webbing worn by the occupant during an emergency involving the vehicle, and the like form protrusions in the passenger compartment, resulting in decreased comfortability of the vehicle and increased possibility of injury to the occupant during an emergency.

SUMMARY OF THE INVENTION

In view of the above facts, the present invention has for its object to provide a seatbelt system capable of allowing an occupant to automatically, securely and comfortably put on seatbelt in which the webbing is obliquely fitted about the upper half of the occupant's body to safely and reliably protect the occupant during an emergency.

In the seatbelt system according to the present invention, a retractor is fixed on a frame the vehicle door to wind up one end of a webbing which restrains an occupant and is obliquely fitted about the upper half of the occupant's body. The occupant is allowed to automatically put on or take off the webbing concomitantly with the opening or closing of the door. An engaging portion is formed on the retractor to engage an engageable portion formed on the vehicle, so that an impact force generated in the webbing during an emergency is imparted to the vehicle through said engageable portion to reliably support the webbing, whereby the occupant is safely protected.

Description will hereunder be given of one embodiment of the present invention with reference to the drawings.

BRIEF DESCRIPTION OF THE DRAWINGS

FIG. 3 is a disassembled oblique view showing the retractor;

FIG. 4 is an oblique view showing the condition of operation performed by an occupant as viewed from inside the vehicle;

DESCRIPTION OF THE PREFERRED EMBODIMENTS

Figure 1:
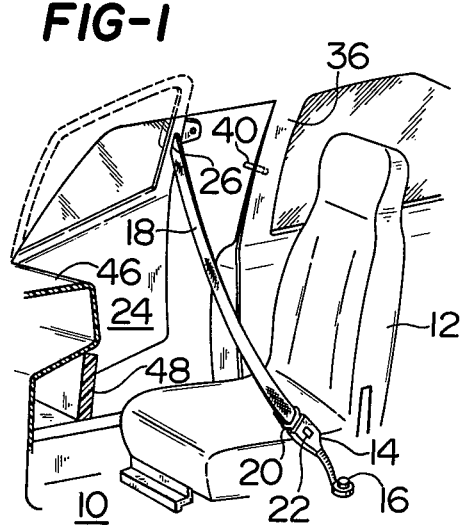
FIG. 1 is an oblique view showing a first embodiment of the seatbelt system according to the present invention as viewed from the inside the vehicle.

In FIG. 1, a seat 12 for an occupant is mounted on a floor member 10 of the vehicle. At one side of said seat 12, i.e. substantially at the central portion of the vehicle, an upwardly extending buckle means 14 is provided whose base is solidly secured to the floor member 10 through a mounting bolt 16.

Engageable with said buckle means 14 is a tongue plate 20 attached to one end of a webbing 18 for restraining an occupant. Tongue plate 20 can be disengaged from said buckle means 14 by pressing a release button 22 of the buckle means 14.

The other end of the webbing 18 for restraining the occupant extends to the outside of the vehicle through a slit 26 formed in a frame of the vehicle door. Webbing 18 is wound up by a retractor 28 installed on the frame of the door 24.

Figure 2:
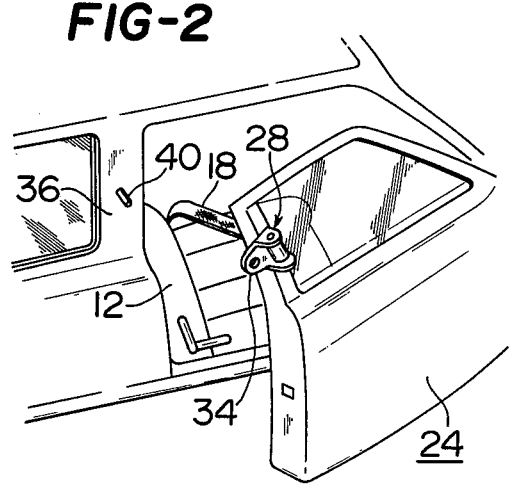
FIG. 2 is an oblique view showing the first embodiment of the seatbelt system according to the present invention as viewed from outside the vehicle (the illustration of a cover being omitted)

As shown in FIGS. 2 and 3, a frame 29 of the retractor 28 is reliably secured to the exterior of a window frame of the door 24 by means of a plurality of rivets 30 and a take-up shaft 32 is rotatably supported by the frame 29 and biased by a spiral spring, not shown, to wind up the webbing 18. Also provided on said retractor 28 is an inertia lock mechanism, not shown, which is adapted to sharply stop the wind-out of the webbing 18 during an emergency.

Furthermore, a portion of said frame 29 extends rearwardly of the vehicle to form a bracket 34 and is adapted to come into contact with the frame surrounding the door at the center pillar 36 of the vehicle when the door 24 is closed as shown in FIG. 3. Bracket 34 is provided with an engaging portion in the form of a cylindrical hole 38 for receiving an engageable portion in the form of a cylindrical pin 40 project from the center pillar 36 toward the outside of the vehicle. Consequently, said bracket 34 and pin 40 secure retractor 28 relative to the door frame and impart the tension applied to the webbing during an emergency to the center pillar 36 through the engagement between the cylindrical hole 38 and the cylindrical pin 40, thus reliably absorbing the impact force of the webbing. The retractor 28 is covered with a cover 42 which engages a cut-out 44 provided in the door 24, which protects the retractor 28 and serves as a dust proof cover for the slit 26.

Next, as shown in FIG. 1, a knee pad 48 formed of an impact absorbing material is provided beneath an instrument panel 46 of the vehicle disposed in front of the seat 12 so that the lower half of the occupant's body when seated can be restrained during an emergency, thereby enabling the vehicle safely to absorb the impact.

Operation of the embodiment of FIGS. 1 to 4 now will be described. As shown in FIGS. 1 and 2, if the occupant opens the door 24 to get into the vehicle, then an appreciable amount of the webbing 18 is wound out of the retractor 28, and the webbing is formed into a straight line due to the wind-up force of the retractor, so that it separates from the seat and moves forward in the vehicle. Then, the occupant can easily sit down on the seat 12. When the door 24 is closed, the excess webbing is wound up by the retractor 20 as shown in FIG. 4, whereby the webbing 18 is automatically obliquely fitted about the upper half of the occupant's body, so that the occupant can be properly restrained.

During an emergency such as a collision, the inertia lock mechanism of the retractor 28 acts on the webbing 18 to instantly stop its wind-out. Consequently, the upper half of the occupant's body is reliably restrained by the webbing 18, and the knee pad 48 prevents the lower half of the occupant's body from moving forward in the vehicle, thus securing the safety of the occupant. During such emergency, if the tension applied to the webbing 18 is extremely high, there is a possibility of damage to the rivets 30 solidly securing the retractor 28 to the door and/or of damage to the frame itself of the door 24. However, the frame 29 of the retractor 28 is reliably fastened to the body of the vehicle by means of cylindrical hole 38 and the cylindrical pin 40 in the present embodiment, so that the body of the vehicle secures the force for supporting the webbing 18, thus ensuring the safety of the occupant.

In case the occupant wants to get out of the vehicle when the inertia lock mechanism of the retractor 28 is acting, he simply presses the release button 22 of the buckle means 14, so that tongue plate 20 is disengaged from the buckle means 14, enabling the occupant to get out easily by opening the door 24.

When the occupant wants to get out of the vehicle during ordinary operating conditions, the webbing 18 can be progressively wound out from the retractor 28 concomitantly with the opening of the door 24. However, the portion of the webbing 18 fitted about the upper half of the occupant's body does not slide on the the occupant's body, resulting in good comfortability. Since the webbing 18 does not slide on the occupant's body, confortable operating condition can be ensured not only while the occupant is getting out of the vehicle but also when the occupant moves about in the vehicle while riding condition as shown in FIG. 4. Further, in the case of getting into and out of the vehicle in wet weather, the moistened portion of the webbing is wound up by the retractor 28, so that the moistened portion does not come into contact with the occupant's body.

Since the retractor 28 is provided at the outside of the door 24 of the vehicle in the present embodiment, there is no protrusion projecting into the interior of cabin, resulting in increased safety for the occupant. Since the protrusion at the outside of the vehicle is located upwardly of the door 24, the maximum breadth of the vehicle is not increased. Moreover, since the insertion slit 26 for receiving the webbing is provided at the side of the vehicle, intrusion of dust into the vehicle can be minimized.

As previously described, the webbing 18 is obliquely and fitted about the upper half of the occupant's body in the present embodiment. However, as indicated by two-dotted chain lines in FIG. 4, it also is possible to provide a three-point seatbelt system wherein the webbing 18 is folded back at the tongue plate 20 to be extended to engage an anchor 50 provided on the door 24 of the vehicle.

Figure 5:
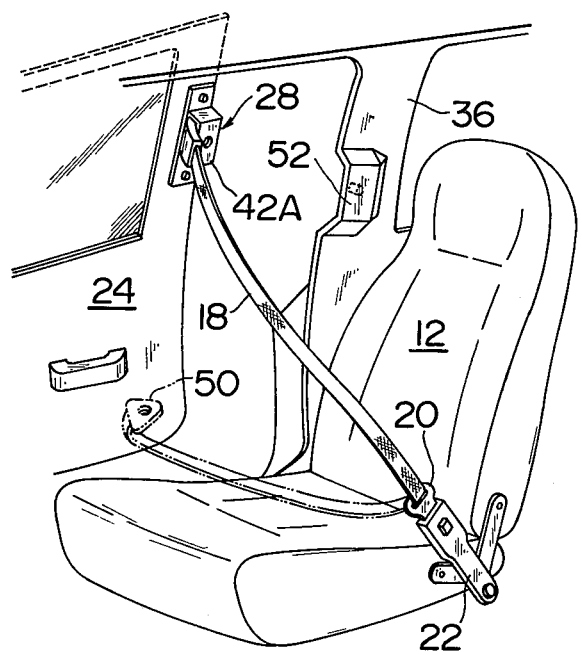
FIG. 5 is an oblique view showing a second embodiment of the present invention as viewed from inside the vehicle.
Figure 6:
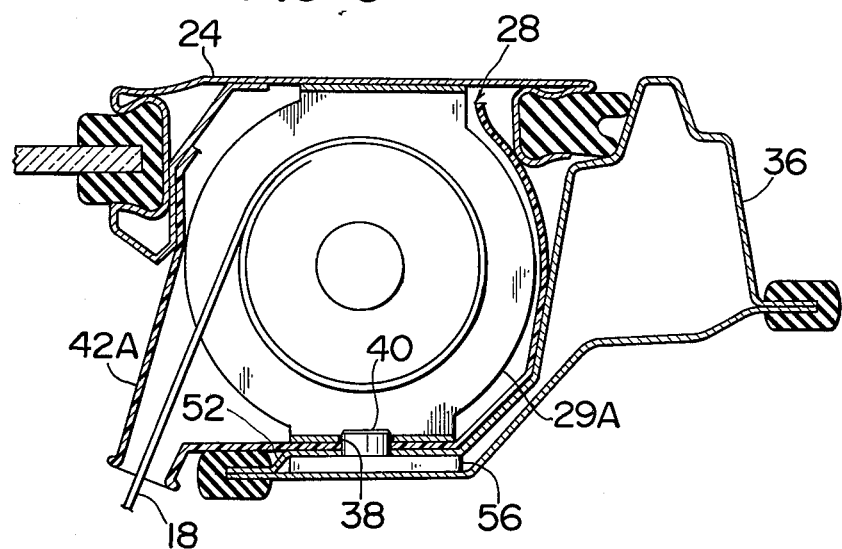
FIG. 6 is a cross-sectional view showing the door closed.
Figure 7:
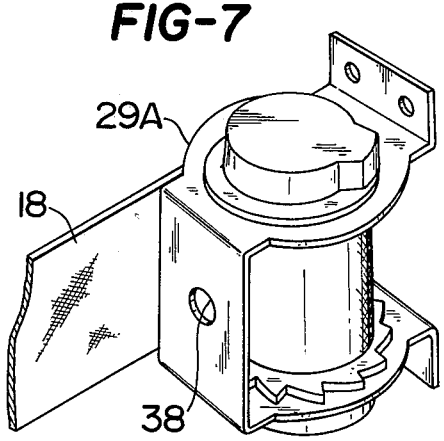
FIG. 7 is an oblique view showing the frame used in the second embodiment.

FIG. 5 shows a second embodiment of the present invention in which the retractor 28 is arranged not to protrude outwardly from the vehicle. More specifically, the retractor 28 is solidly secured to an inner and upper portion of the door 24 of the vehicle, and the center pillar 36 is formed on its outer side with a recess 52 for receiving the retractor 28 when the door is closed, whereby the inner side portion of the center pillar is slightly protruded. As shown in FIGS. 6 and 7, the retractor 28 is provided at the frame 29A thereof with a cylindrical hole 38 through which a cylindrical pin 40 projects from a strength member 56 embedded in a bulged portion 52 directed to the outside of the vehicle.

Consequently, when the door 24 is closed, the cylindrical hole 38 of the frame 29A engages the strength member 56, so that the same effect as in the preceding embodiment can be obtained. In addition, the retractor 28 is provided with a cover 42A in this embodiment also, so as to protect the retractor when the door 24 is opened. Since there is no slit communicating between the inside and outside of the cabin unlike the preceding embodiment, the intrusion of dust into the cabin can be reliably prevented.

Figure 8:
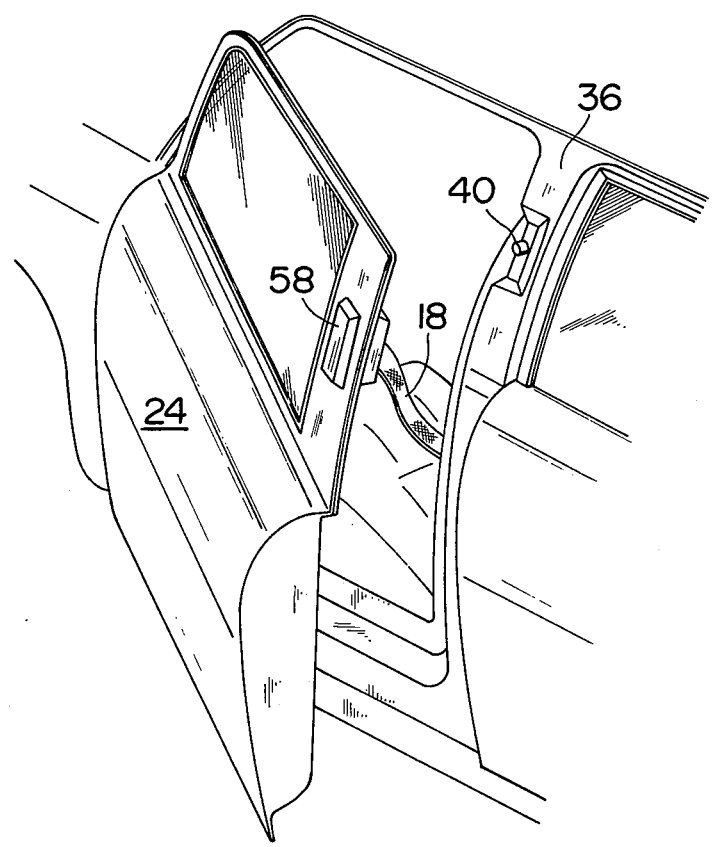
FIG. 8 is an oblique view showing a third embodiment according to the present invention as viewed from outside the vehicle.
Figure 9:
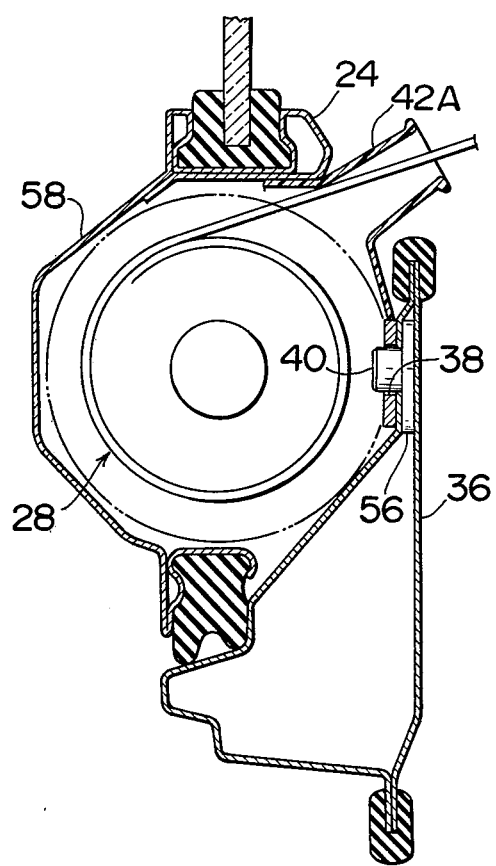
FIG. 9 is a cross-sectional view showing the door closed in the third embodiment of the present invention.

FIGS. 8 and 9 show a third embodiment of the present invention, in which the retractor 28 is provided at the inside of the door 24 but is arranged to have no bulging form in the vehicle.

More specifically, a portion of the door 24 for getting on and off the vehicle is formed into a bulged portion 58, in which the retractor 28 is received from the inside of the vehicle and installed thereto. Hence, the contour of the center pillar 36 at the inside of cabin is similar to that in the first embodiment; that is, the center pillar has no portion which into the passenger compartment. Additionally, the construction other than the above is identical with the aforesaid second embodiment. Consequently, in said third embodiment, the intrusion of dust into the cabin can be reliably prevented and the bulging portion directed into the cabin due to the installation of the retractor can be eliminated, thereby providing improved comfortability. In addition, as shown in FIG. 8, the bulging portion 58 directed to the outside of the vehicle is disposed at the upper portion of the door 24, and hence, exerts no influence upon the maximum breadth of the vehicle.

As has been described above, in the seatbelt system according to the present invention, one end of the webbing is wound up by the retractor which is solidly secured to the frame of the door of the vehicle, so that automatic fitting of the webbing to the occupant's body can be very comfortably performed with no portion of the webbing sliding on the occupant's body when the webbing is automatically fitted to the occupant's body, and the intrusion of foreign materials onto the floor and the like in the cabin can be prevented. Furthermore, the engaging portion provided on the retractor is engaged with the engageable portion of the vehicle when the door is closed, whereby the webbing supporting force during an emergency is reliably imparted to the vehicle, thereby presenting such excellent advantages such as eliminating any necessity of providing the door of the vehicle with more rigidity than is normally required and yet reliably ensuring the safety of the occupant.

What is claimed is:

1. A seatbelt system for a vehicle of the type having at least one passenger door surrounded by a door frame in the vehicle body into and out of which frame the door moves when closing and opening, said system comprising:

a length of webbing for restraining a passenger;
    retractor means installed at an upper portion of said door and attached to one end of said length of webbing for winding up said length of webbing;
    means for attaching the other end of said length of webbing within said vehicle so that said length of webbing is fitted obliquely to or released from the passenger as said door is closed or opened, respectively;
    an engaging portion formed on said retractor means; and
    an engageable portion formed on said door frame to be engageable by said engaging portion, for securing said retractor means relative to said door frame and yet allowing said length of webbing to move into and out of said retractor means when said door is closed, whereby forces applied to said length of webbing during an emergency are imparted to said vehicle body via said engaging and engageable portions.

2. A seatbelt system according to claim 1, wherein said engaging portion comprises a hole formed in a frame of said retractor means and said engageable portion comprises a pin formed on said door frame and engageable with said hole when said door is closed.

3. A seatbelt system according to claim 2, wherein said pin is provided on the exterior side of a center pillar of said door frame.

4. A seatbelt system according to claim 3, wherein said retractor means is installed at the upper portion of the outside of said door.

5. A seatbelt system according to claim 4, wherein said retractor means comprises a frame having a portion extending rearwardly of the vehicle, said hole being formed in said rearwardly extending portion.

6. A seatbelt system according to claim 5, further comprising a slit in said door through which said length of webbing extends from said retractor means into said vehicle.

7. A seatbelt system according to claim 1, wherein said retractor means is installed at the inside of said door.

8. A seatbelt system according to claim 7, wherein said door frame is provided with a recess in its center pillar for receiving said retractor means.

9. A seatbelt system according to claim 8, wherein said door is provided with an outwardly bulging portion for receiving said retractor means.

10. A seatbelt system for a vehicle of the type having at least one passenger door surrounded by a door frame in the vehicle body into and out of which frame the door moves when closing and opening, said system comprising:

a length of webbing for restraining a passenger;
    retractor means installed at an upper portion of said door and attached to one end of said length of webbing for winding up said length of webbing, said means having a frame;
    means for attaching the other end of said length of webbing within said vehicle so that said length of webbing is fitted obliquely to or released from the passenger as said door is closed or opened, respectively;
    a hole formed in said frame of said retractor means; and
    a pin extending from said door frame on the exterior side of a center pillar of said door frame, for engaging said hole when said door is closed.

11. A seatbelt system according to claim 10, wherein said retractor means is installed at the upper portion of the outside of said door.

12. A seatbelt system according to claim 11, wherein said retractor means comprises a frame having a portion extending rearwardly of the vehicle, said hold being formed in said rearwardly extending portion.

13. A seatbelt system according to claim 12, further comprising a slit in said door through which said length of webbing extends from said retractor means into said vehicle.

14. A seatbelt system for a vehicle of the type having at least one passenger door surrounded by a door frame in the vehicle body into and out of which frame the door moves when closing and opening, said system comprising:

a length of webbing for restraining a passenger;
    retractor means installed at an upper portion of said door on the inside thereof and attached to one end of said length of webbing for winding up said length of webbing, said means having a frame;
    means for attaching the other end of said length of webbing within said vehicle so that said length of webbing is fitted obliquely to or released from the passenger as said door is closed or opened, respectively;
    an engaging portion formed on said retractor means; and
    an engageable portion formed on said door frame to be engaged by said engaging portion for securing said retractor means relative to said door frame, said door frame comprising a recess on the outside of its center pillar for receiving said retractor means.

15. A seatbelt system according to claim 14, wherein said door is provided with an outwardly bulging portion for receiving said retractor means.

* * * * *